Figure 1:
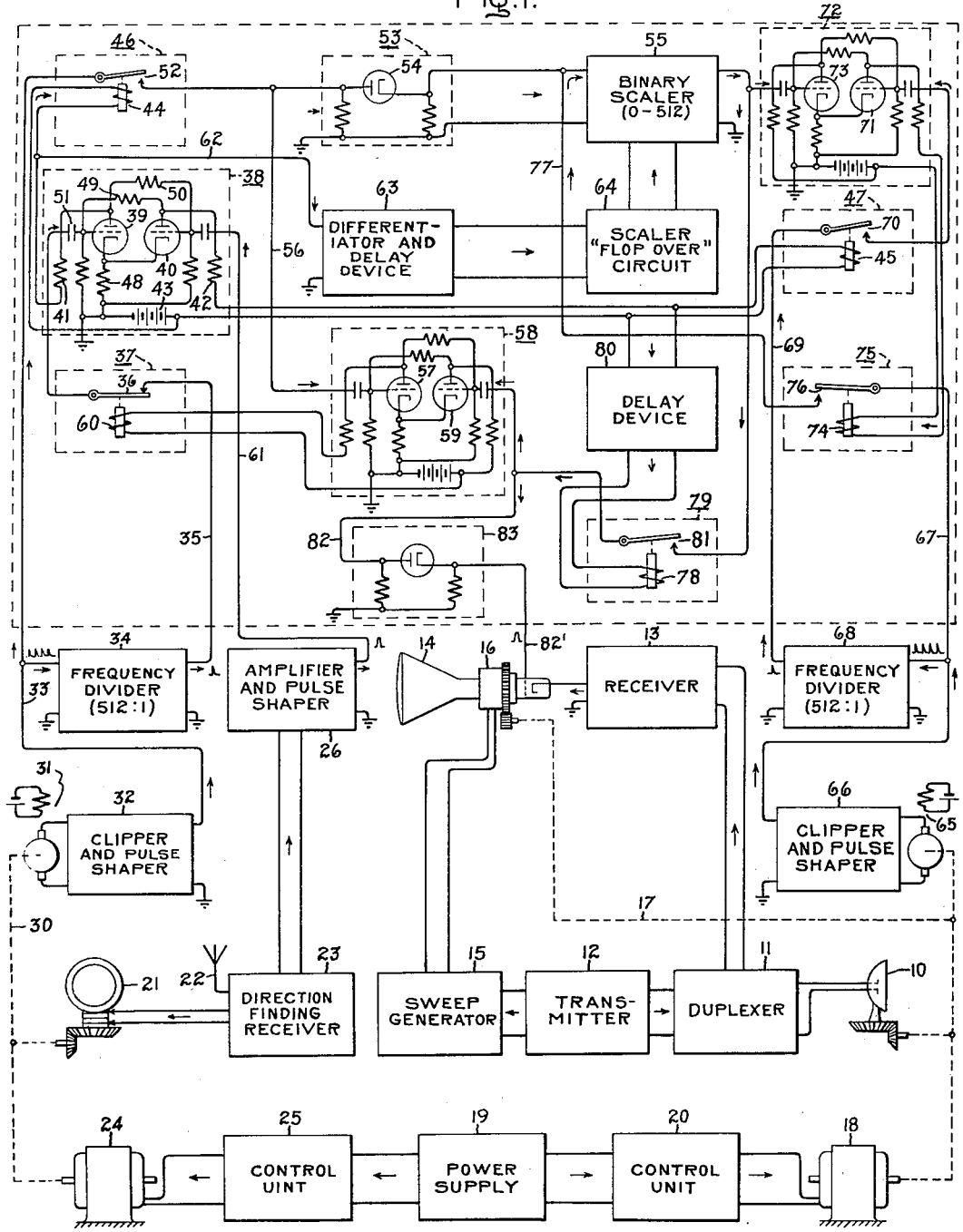

May 8, 1956  R. C. JENSEN  2,745,096
BEARING CORRELATING SYSTEM
Filed June 2, 1952  2 Sheets-Sheet 1

Inventor:
Richard C. Jensen,
by Merton D Moore
His Attorney.

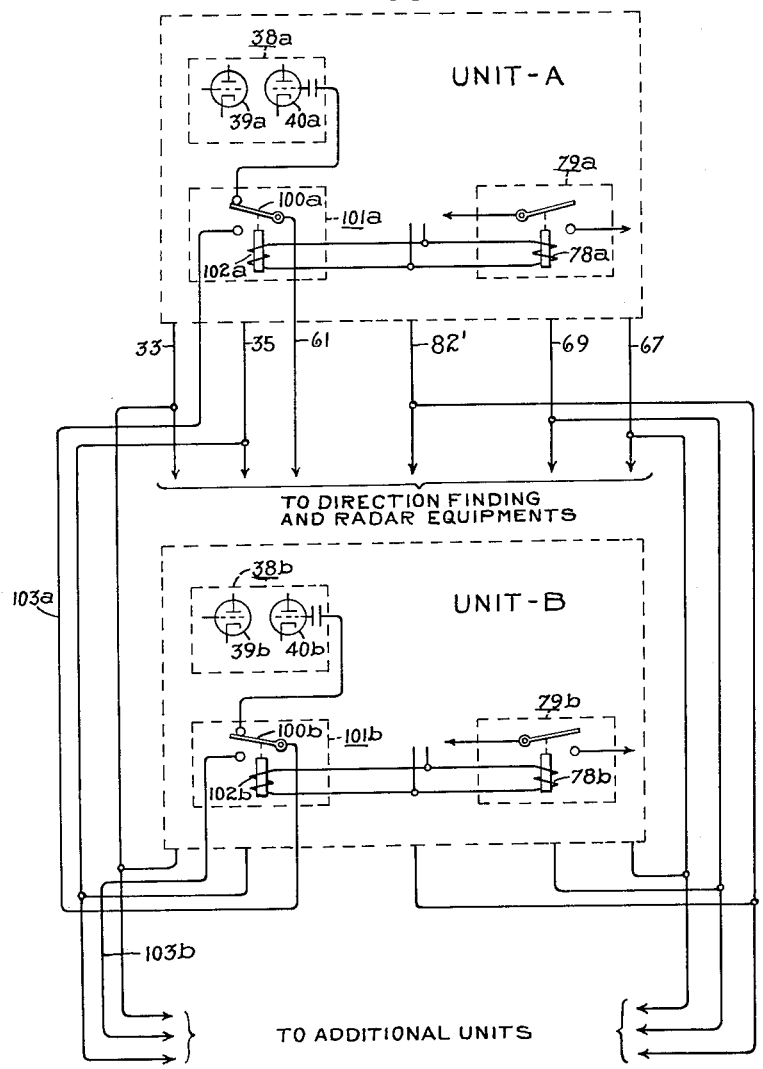

United States Patent Office 2,745,096
Patented May 8, 1956

2,745,096

BEARING CORRELATING SYSTEM

Richard C. Jensen, Baldwinsville, N. Y., assignor to General Electric Company, a corporation of New York Application June 2, 1952, Serial No. 291,087

13 Claims. (Cl. 343—11)

My invention relates to object locating apparatus and, more particularly, pertains to a novel bearing-correlating system for comparing the orientation of a pair of individually rotatable, energy-receiving devices.

Although subject to a wide variety of applications, my invention is ideally suited for use in an installation including pulse-echo equipment of the radar-search type and direction-finding (D-F) equipment and it is an object of the invention to provide a novel system for correlating the bearing information determined through the use of the rotatable, energy-receiving directional antennas of these equipments. In that way both antennas may be oriented at the bearing of a remote object which originates wave energy and which reflects wave energy radiated by the radar equipment thereby to assist the identification of that particular object.

Another object of my invention is to provide a novel bearing-correlating system for a pair of directional antennas which may be rotated at different, possibly non-synchronous speeds.

Yet another object of my invention is to provide a novel bearing-correlating system for comparing the orientation of the rotatable, energy-receiving devices of individual equipments without reducing the normal operating efficiencies of these equipments.

A bearing-correlating system in accordance with my invention comprises counting means for recording the bearing or azimuthal position of a remote object determined through the use of one of a pair of rotatable, directional energy-receiving devices and for producing an indication when the other device is rotated in that azimuthal position.

The novel features which are believed to be characteristic of my invention are set forth with particularity in the appended claims. The invention itself, however, both as to its organization and method of operation, together with further objects and advantages thereof may best be understood by reference to the following description taken in connection with the accompanying drawing in which:

Fig. 1 is a block diagram, partly schematic, of a bearing-correlating system in accordance with my invention shown in association with radar and D-F equipments; and Fig. 2 represents a modification of the arrangement shown in Fig. 1.

Referring now to Fig. 1 of the drawing, the radar equipment illustrated in the lower-right portion of the figure includes a rotatable, directional antenna 10 to which pulses or "bursts" of radio-frequency energy are supplied through a duplexer unit 11 by a transmitter 12 for radiation into space. These pulses travel through space and may impinge upon a reflecting surface of a remote object and are thus returned toward the site of the radar apparatus for interception by antenna 10.

Received echo-pulses of radio-frequency energy from the antenna are applied through duplexer 11 to a receiver 13 for demodulation. Duplexer 11 may be of any suitable construction for preventing damage and/or blocking of the receiver 13 during the occurrence of radio-frequency pulses at transmitter 12 and for translating intercepted echo pulses from antenna 10 to the receiver with substantially no attenuation which might otherwise occur because of the connection between antenna 10 and transmitter 12.

Receiver 13 derives from the received pulses of radio-frequency energy an undulating potential including pulses representing the reflected pulses of wave energy and this potential is supplied to the cathode circuit of a cathode-ray type indicator 14 which displays echo pulses in such a manner that both bearing and range information of reflecting objects are presented.

As is generally well-known, the velocity of propagation of radio-frequency energy is substantially constant and, hence, the range of a reflecting object may be determined by measuring the total travel time of a reflected pulse. In the radar equipment of Fig. 1 this is performed through the use of an accurate time-base sweep for cathode-ray device 14 provided by a sweep generator 15. Generator 15 may comprise any well-known form of circuit for deriving a highly-linear sawtooth wave having each of its undulations initiated with the transmission of a pulse of radio-frequency energy. The pulser portion (not shown) of transmitter 12 is coupled to generator 15 and hence, the necessary synchronism is maintained.

Generator 15 supplies a sweep wave to the deflection coils (not shown) of a deflection yoke 16 encompassing the neck portion of cathode-ray device 14. The sweep thus causes the beam of device 14 to be deflected along a linear path originating at the center of the viewing screen and terminating at the edge thereof.

The deflection yoke 16 is rotatable relative to the neck of device 14 and is mechanically coupled by suitable gearing, shown for convenience by a dash line 17, for rotation with antenna 10. Yoke 14 rotates once for each revolution of antenna 10.

The sweep wave applied to yoke 16 deflects the electron beam radially in a direction corresponding to the orientation of antenna 10 and the intensity of the electron beam projected toward the viewing screen is increased in response to each echo pulse. Hence, received echoes from one or more remote objects produces intensified spots on the viewing screen at respective distances from the center of the screen proportional to the range of the corresponding objects. The angle subtended by a reference radial line and a radial line intercepting an object indication represents the bearing of the object. Therefore, the radar equipment may be utilized to determine both range and bearing of remote objects.

Antenna 10 usually is continuously rotated about a vertical axis by a driving motor 18 which is powered from a source 19. A control unit 20 is provided so that the rotational speed of motor 18 may be adjustably fixed. Since the viewing screen of indicator 14 has a persistance comparable to the time of several revolutions of the antenna 10, a map-like or plan-position presentation of remote objects in the area surrounding the radar equipment is displayed on the screen.

The arrangement of Fig. 1 also includes direction finding (D-F) equipment, shown in the lower left portion of the figure. This equipment comprises an antenna system including a directional, rotatable loop antenna 21 and a sense antenna 22 for intercepting radio-frequency energy radiated from remote stations. The antennas 21 and 22 are coupled to a receiver 23 in such a manner that the overall space pattern of the antenna system is essentially unidirectional, having an axis of maximum directivity.

Antenna 21 is continuously rotated about a vertical axis by a driving motor 24 which is powered from source 19. Another control unit 25 permits an individual speed adjustment for antenna 21.

In operation, receiver 23 is tuned to the transmitting frequency of a remote station and as antenna 21 rotates, the amplitude of the radio-frequency energy supplied to the receiver varies from a low value to a maximum and to the low value as the axis of maximum antenna directivity is altered from one side to the exact bearing of the remote transmitter and thence to the other side. Thus, a pulse of radio-frequency energy is applied to receiver 23 each time the antenna rotates through the bearing of the remote transmitter and my invention is adapted to utilize the demodulated pulse from the receiver to produce an indication on the viewing screen of cathode ray device 14 in the radar apparatus. This indication is positioned in the map-presentation at the correct bearing of the remote transmitter and, antenna 10 of the radar apparatus may be brought to bear on the remote transmitter and its distance determined by radar-ranging. By thus correlating the bearing information of the D-F and radar equipments their usefulness may be materially enhanced.

In brief, this is accomplished by means for storing bearing information derived by the D-F apparatus and for utilizing this information to provide an indication upon the radar indicator when the radar antenna rotates to the particular bearing. The storage means comprises a scaling unit which counts or integrates pulses, other than those due to reception of energy, that are generated in response to rotation of the D-F antenna. The same count is repeated for each 360° of rotation so that when the count of the scaler is stopped by a pulse due to the reception of radio-frequency energy, from a remote transmitter the count of pulse-sum represents the bearing of that transmitter.

Pulses are also generated in response to rotation of the radar antenna so that as the radar antenna rotates, the registered count may be effectively repeated in the scaler. When this occurs, a pulse is supplied to the radar indicator thereby to indicate the azimuthal position of the remote transmitter. If, for example, the remote transmitter is carried by a vehicle such as an aircraft, the radar apparatus may then be employed for range determination through the use of pulses of radio-frequency energy which are re-radiated from a reflecting surface of the craft.

Turning now to the details of the bearing-correlating system embodying the present invention, antenna 21 is mechanically coupled via suitable gears, illustrated by a dash line 30, to the rotor of an alternating potential generator 31 to the stator winding of which a unidirectional potential is applied. The generator produces an output potential of sinusoidal form having a frequency equal to five hundred twelve times the rotational speed of the antenna, i. e., 512 complete output cycles are derived for each revolution of the antenna. This output potential is supplied to a clipper and pulse shaper 32 of conventional construction for selecting the potential variations of a selected one-half of each operating cycle to produce at a lead 33 one pulse for each cycle in the sine wave.

The successive pulses at lead 33 are applied to a frequency divider 34 which may comprise a plurality of stages of known construction for deriving a single pulse at a lead 35 for each series of 512 pulses at its input circuit. Preferably, mechanical coupling 30 is adjusted so that this single pulse appears as antenna 21 rotates through a bearing of zero degrees, or a due north direction, and each of these pulses serve as a reference pulse which delineates this bearing. Each of the series of 512 pulses thus defines one of a succession of equal, angular steps of approximately 0.7 degrees of antenna rotation from the reference bearing.

Reference pulses are supplied over lead 35 and via normally closed contacts 36 of an electromechanical relay 37 to a bi-stable multivibrator type circuit 38, commonly referred to as a trigger. Trigger 38 comprises a pair of electron discharge devices 39 and 40 having individual anode resistors 41 and 42 connected to a source of anode potential 43, through relay coils 44 and 45 respectively of relays 46 and 47. Multivibrator 38 further comprises a common cathode resistor 48 connected to ground and coupling resistors 49 and 50 which individually connect the anode of one of devices 39 and 40 to the control electrode of the other. Individual resistors connect the control electrodes of devices 39 and 40 to ground.

This type of trigger circuit, as is generally well understood, has two stable operating conditions in which one of devices 39 and 40 is highly conductive and the other is cut off. This occurs because anode current of the conductive devices produces a potential drop across common cathode resistor 48 which is sufficient to maintain the control electrode-cathode potential of the other more negative than the cut off value. If a positive potential is applied to the control electrode of the device that is cut off, anode current flows therein causing a potential drop across its anode resistor which, via the ocrresponding one of coupling resistors 49 and 50, carries the control electrode of the conductive device negatively. This reduces the potential drop across cathode resistor 48 thereby permitting a greater anode current to flow in the formerly non-conductive device. The action is regenerative and, almost instantaneously, the conductive conditions are reversed between device 39 and 40.

Let it be assumed that just prior to the operating interval in which antenna 21 rotates to the reference position, the condition of trigger 38 is such that device 40 is conductive and device 39 is cut off. As the antenna rotates through the reference position the single pulse which delineates that position is applied with positive polarity over lead 35 contacts 36 and a coupling condenser 51, to the control electrode of device 39. This immediately alters the conditions of conductivity and device 39 becomes conductive. Since anode current of device 39 flows through coil 44 of relay 46, normally open contacts 52 are closed and an extension of lead 33 is connected to a unidirectionally-translating circuit 53 which may for example comprise a series diode 54. The series of positive pulses from stage 32 thus is applied via the circuit 53 to a binary scaler 55 which may be of any well-known construction for counting or summing any number of applied pulses up to 512, or the total number of pulses produced in response to a single revolution of antenna 21. It may, for example, comprise nine scale-of-two counters in a conventional circuit arrangement of nine twin triodes. An output pulse is produced by scaler 55 following the application thereto of 512 pulses whereupon it is automatically conditioned for another counting operation.

The first in the series of pulses which is applied to scaler 55 is also applied over a lead 56, which extends from contacts 52, to the normally non-conductive device 57 of another trigger circuit 58 which includes a normally conductive device 59. Trigger 58 is similar in construction to trigger 38 and the applied pulse reverses the conditions of conduction between devices 57 and 59. Energizing coil 60 of relay 37 is in the anode circuit of device 57 and upon device 57 becoming non-conductive, normally closed contacts 36 of this relay are opened. As a result, once counting of pulses begins, reference pulses at lead 35 are prevented from operating trigger 38 until the count in the scaler is utilized.

Scaler 55 counts pulses to derive a sum corresponding to rotation of antenna 21 from the reference position and the count is stopped at the bearing of a radio-frequency transmitter. Specifically, an output pulse from receiver 23, defining the bearing at which maximum energy is supplied thereto by antenna 21, is amplified and shaped in stage 26 and applied over a lead 61 to the control electrode of device 40 in multivibrator 38. This positive pulse immediately restores the initially-assumed conditions with device 40 conductive and device 39 cut off, thereby de-energizing coil 44 of relay 46. As a result, contacts 52 are opened to interrupt the supply of pulses to scaler 55 which thus stops counting at a recorded total of pulses which define the bearing of the remote transmitter.

In order to utilize the recorded total in scaler 55, means are provided for conditioning the scaler to produce an output pulse upon the application of a number of pulses essentially equal to the recorded total. For this purpose coil 44 is connected by a lead 62 to a differentiation and delay device 63 which derives from the voltage pulse, produced by de-energization of the coil, a short control pulse slightly delayed in time from the voltage pulse. The control pulse is supplied to a scaler "flopover" circuit 64 which is coupled to scaler 55. The delay imposed in unit 63 is provided to assure that the scaler counts all the pulses prior to the reception of energy from a remote transmitter before circuit 64 operates on the scaler.

Circuit 64 may be of any well-known construction for conditioning scaler 55 as required. For example, if the scaler is comprised of nine twin triodes, circuit 64 may comprise means for utilizing a pulse from unit 63 to reverse the conditions of conduction between each pair of twin triodes and include a number of diodes sufficient to prevent feedback or feed-through from one pair of twin triodes to the next. Scaler 55 thus is conditioned to produce an output pulse as it is returned to an initial state with the application of a number of pulses equal to the recorded total plus one. The additional pulse, of course, is characteristically required in this type of operation of a binary scaler. Further details of scaler 55 and circuit 64 are deemed unnecessary inasmuch as these elements are generally well-known in the art.

To define the rotational position of radar antenna 10 in terms of pulses, this antenna is mechanically coupled to an alternating potential generator 65 by an extension of gear-linkage 17. Generator 65, like generator 31, supplies to a clipper and pulse shaper stage 66, 512 complete cycles of a sine wave for each revolution of antenna 10. The resulting pulses from stage 66 are applied over a lead 67 to a 512 to 1 frequency divider 68 which, like divider 34, produces one reference pulse at an output lead 69 for each 512 input pulses. The mechanical coupling is arranged so that this reference pulse occurs when radar antenna 10 passes through a position approximately 0.7 degrees before due north, as it rotates in the same direction as D-F antenna 21. The reference occurs one pulse prior to the zero degree position in order to accommodate the requirement of scaler 55 of one pulse additional to the recorded total, as pointed out hereinbefore.

In the condition of operation under consideration, with scaler 55 ready to count a recorded total of pulses plus one, device 40 of trigger 38 is conductive and its anode current energizes coil 45 of relay 47. Normally open relay contacts 70 thus are closed and the reference pulse at lead 69 is applied through these contacts to the normally non-conductive device 71 of a trigger 72 which also includes a normally conductive device 73. Trigger 72 is similar in construction to trigger 38 and the applied pulse reverses the conductive conditions so that device 71 becomes conductive and device 73 is cut off. A relay coil 74 of an electromechanical relay 75 is in the anode circuit of device 71 and the anode current of this device energizes the coil. Thus, normally open relay contacts 76 are closed and the series pulses at lead 67 following the occurrence of a reference pulse is applied over a lead 77 to the input of scaler 55.

Energizing coil 78 of another relay 79 is effectively in parallel with coil 45, but a delay device 80 is interposed therebetween. In that way, shortly after coil 45 is energized, coil 78 is also energized to close normally open contacts 81 of relay 79 and connect the output of scaler 55 to a lead 82 extending to a unidirectional translating device 83, which may be like device 53, and in turn, coupled by a lead 82' to the control electrode of cathode ray indicator 14. Diode 83 is used for isolation purposes so that more than one D-F receiver and/or more than one counting unit may be employed with indicator 14.

As radar antenna 10 rotates from its reference position, the pulses at lead 67 are counted. Since circuit 53 is unidirectionally-translating, these pulses cannot operate trigger 58. Upon the application of the recorded total of pulses plus one, the derived output pulse from scaler 55 is supplied with positive polarity over contacts 81, lead 82, device 83 and lead 82' to the control electrode of cathode ray indicator 14. The trace on the viewing screen of the indicator is thereby brightened along a radial sweep corresponding to the bearing of antenna 10 when it coincides with the bearing determined by antenna 21. Of course, the trace may be brightened along a part of or over several sweeps depending on sweep time and pulse length. This action may be synchronized as will be pointed out hereinafter. The radar apparatus may thereafter be operated to determine the range of the remote object for which a bearing is thusly indicated.

The output pulse from scaler 55 is also supplied to the control electrode of device 73 of trigger 72 and reverses the conditions of conductivity. Thus, device 73 becomes conductive and device 71 is cut off to de-energize coil 74 and open contacts 76 of relay 75. In addition, the output pulse is applied via contacts 81 of relay 79 to the control electrode of device 59 in trigger 58 to reverse the conditions of conductivity therein. As a result, device 58 becomes conductive and device 57 is cut off to de-energize coil 60 and close contacts 36 of relay 37.

The bearing correlating system thus is placed in the same operative condition defined hereinbefore as existing just prior to the interval in which antenna 21 rotates to its reference position. As antenna 21 rotates, the pulse at lead 35 denoting the antenna reference position is supplied to trigger 38 to reverse the condition of conductivity, device 39 becoming conductive and device 40 being cut off. As a result, coil 44 is energized to close contacts 52 of relay 46 and counting in scaler 55 is initiated. Further, the action in trigger 38 de-energizes coil 45 to open contacts 70 of relay 47 and de-energizes coil 78 to open contacts 81 of relay 79. When D-F antenna 21 rotates to the same bearing recorded in the prior cycle, assuming that the remote object carrying the transmitter has not materially altered its bearing, a pulse from receiver 23, via stage 26, is applied to the control electrode of device 40 of trigger 38 thereby to interrupt counting and the cycle is repeated in the manner described hereinbefore.

It may be appropriate to point out that relays 46 and 75 may be considered as being in a relay circuit for coupling pulse generating systems 31—34 and 65—68 with counter 55. Trigger 38 interlocks these relays so that in any operating interval, only one of the pulse generating systems may be coupled to the counter.

It is, therefore, apparent that each time D-F antenna 21 rotates from its reference position through the bearing of a remote transmitting station, a count is recorded in scaler 55 which denotes the angular travel of this antenna. The angular travel of radar antenna 10 from its reference position also is measured by scaler 55 and when this coincides substantially with that recorded for antenna 21, a trace-brightening pulse produces an indication on the viewing screen of cathode ray device. This occurs along a radial line that defines the bearing on which the remote station lies.

Since the system operates on the basis of measuring absolute angles, there are no requirements as to relative speeds, and/or synchronism in the rotation of antennas 10 and 21. This, of course, is advantageous for each of the radar and D–F equipments may be operated in the manner best suited to its need. Hence, the bearing correlating system in accordance with my invention does not impose any operating limitations or reductions in efficiency on either of these equipments, although it functions to correlate direction information derived thereby.

For an operating condition in which no wave energy is intercepted by antenna 21, each reference pulse alters the conditions of conductivity in trigger 38, so that device 39 is conductive and device 40 is cut off. The first of the pulses to be counted by scaler 55 is applied to trigger 56 so that device 57 becomes conductive and device 59 is cut off thereby opening contacts 36 of relay 37.

Moreover, since device 40 of trigger 38 is cut off, coil 78 is de-energized and contacts 81 of relay 79 remain open so that the output pulse of scaler 55 is not applied to indicator 14. An output pulse, of course, occurs with the application of each series 512 pulses due to rotation of antenna 21 through 360°. In addition, since device 73 of trigger 72 is in a conductive condition the output pulse has no effect on this trigger.

The component elements of the system remain in the foregoing conditions until the occurrence of a pulse from D–F receiver 23 causes device 40 of multivibrator 38 to become conductive and device 39 is cut off. A cycle of operation thus is initiated wherein an indication is produced on cathode ray device 14.

It is possible to operate the bearing correlating system with antennas 10 and 21 rotating in opposite directions. For this condition, elements 63 and 64 are not required and the "one-pulse" lag imposed on the reference position of antenna 10 is not necessary. Scaler 55 counts the pulses produced by rotation of antenna 21 to derive a recorded total, say $n$ pulses, and as antenna 10 rotates in the opposite direction from its reference position, pulses are counted. With the occurrence of $512-n$ pulses due to rotation of antenna 10, scaler 55 produces an output pulse to indicate the arrival of antenna 10 at the recorded bearing.

It should be understood that although the pulse generating systems 31—34 and 65—68 have been illustrated as of a particular variety, other suitable arrangements may be employed. For example, the generators 31 and 65 may be of the type which produces both the reference and series of pulses. Alternatively, in an installation wherein motors 18 and 24 are of the synchronous type and source 19 supplies an alternating potential of fixed frequency, well-known circuits may be employed for deriving the required reference and series of pulses for each of antennas 10 and 21 directly from source 19.

Moreover, while relays 37, 46, 47, 75 and 79 have been shown and described as of the mechano-electrical variety, they may be replaced with any suitable type of electron discharge relay. This substitution may be advantageous in an installation wherein antennas 10 and 21 are rotated at high speeds, thereby requiring extremely fast action in the bearing correlating system.

Still further, although the trace-brightening pulse which is applied to indicator 14 by scaler 55 has not been defined as having any particular synchronous relationship with the sweep wave of generator 15, it is to be understood that such synchronism may advantageously be employed. For example, the pulse at lead 82' may be employed operatively to condition a synchronized pulse generator which supplies to the control electrode of device 14 a single pulse which persists for the duration of the immediately following one of the sawtooth undulations from generator 15.

If the antenna system of the D–F equipment has a narrow antenna-beam pattern, more than one counter, such as scaler 55, may be controlled by the D–F receiver to record the bearings of a number of remote stations which simultaneously transmit on the same operating frequency. The circuit arrangement of Fig. 2 is ideally suited for this purpose and may be associated with the radar and D–F equipments illustrated in Fig. 1.

The arrangement of Fig. 2 includes means for recording the bearings of two remote stations through the use of two separate units designated "A" and "B" respectively. In each of these units there is included the elements of the bearing correlating system of Fig. 1 and corresponding elements are identified by the same reference numerals followed by the letter "$a$" or "$b$," as the case may be.

In describing this embodiment of the invention, it is assumed that the same set of initial conditions exist as defined in connection with the description of Fig. 1. As antenna 21 rotates to its reference position, the generated reference pulse at lead 35 conditions unit A so that its scaler may count the series of pulses at lead 33 which define the rotational position of this antenna. With the interception of a transmitted wave at a particular bearing, a pulse at lead 61 from receiver 23, is applied via the movable arm and upper contact of a set of single pole, double throw contacts $100a$ in a relay $101a$ to the control electrode of device $40a$ of trigger $38a$. As described in connection with Fig. 1, this conditions the system for counting the pulses which define rotation of radar antenna 10 and coil 78 of a relay $79a$ is energized. The coil $102a$ of relay $101a$ is paralleled with coil $78a$ and, hence, it too is energized to carry the movable arm of contacts $100a$ into circuit engagement with the lower contact and lead 61 is thereby connected to a lead $103a$ which extends toward unit B.

At the same time the scaler of unit A begins to count pulses, the reference and series of pulses at leads 33 and 35 causes the scaler of unit B to begin counting. However, before a pulse at lead 61 alters the conditions of relay contacts $100a$, there is no connection between leads 61 and $103a$. Consequently, the first pulse at lead 61 operates on unit A alone.

Since the first pulse completes a circuit connection between leads 61 and $103a$, the following pulse at lead 61 is applied via the movable arm and upper contact of a set of single pole, double throw contacts $100b$ of a relay $101b$ to the control electrode of device $40b$ of trigger $38b$ and counting is stopped in the scaler of unit B. This pulse also causes energization of coil $78b$ of relay $79b$ as well as the paralleled coil $102b$ of relay $101b$ and lead 61 is connected to lead $103b$, which may extend to additional units.

Thus, in each of units A and B there is recorded an individual total of pulses corresponding to the angular positions or bearings at which each of two transmitting stations was detected. As radar antenna 10 rotates from its reference position, the reference pulse at lead 69 initiates counting of the series of pulses at lead 67 and when the registered count in the scaler of unit A is repeated a pulse is supplied over lead 82' to indicator 14 and the same occurs when the registered pulse is repeated in unit B.

In this way, the radial trace on the viewing screen of the indicator is brightened at the moment radar antenna 10 reaches the bearing of each of the two transmitting stations. Of course, units A and B are reconditioned by the output pulses of their respective scalers in the same manner as described in connection with Fig. 1.

It may be appropriate to point out that more than one unit may register the same aircraft signal received by the D–F equipment at the particular time when trigger 38 has been operated by a reference pulse, and before coil $102a$ or $102b$ is deenergized via delay device 80. In this interval it is possible for a signal to operate trigger 38 of each of units A and B simultaneously unless contacts $101a$ or $101b$ are open. This may be accomplished by utilizing the reference pulse on lead 35 to de-energize coil 102a or 102b until the output of trigger 38 (via delay device 80) takes over. A circuit to perform this function may be associated with a relay 101a or 101b of the electron discharge type. The reference pulse at lead 35 thus may be employed to cut off the electron discharge device.

While particular embodiments of my invention have been shown and described, it is apparent that changes in modifications may be made without departing from the invention in its broader aspects, and, therefore, the aim in the appended claims is to cover all such changes and modifications as fall within the true spirit and scope of my invention.

What I claim as new and desire to secure by Letters Patent of the United States is:

1. In combination with a pair of rotatable, directional energy-receiving devices, integrating means coupled to one of said devices for deriving a first sum of incremental angular movements thereof from a reference bearing to the bearing at which energy is received by said one device from an energy-transmitting object, means coupling said other of said devices to said integrating means for deriving a second incremental sum of angular movements thereof from a reference bearing, and means included in said integrating means for producing an indication when said first and said second sums are substantially equal.

2. In combination, a first pulse generator for producing a series of pulses defining incremental angular movements of a first rotatable device, a counter coupled to said first pulse generator for deriving a sum of at least a portion of the pulses in said series, a second pulse generator coupled to said counter for producing another series of pulses defining incremental angular movements of a second rotatable device, and means included in said counter for producing an indication upon the application thereto of a number of pulses of said other series substantially equal to said sum.

3. In combination with direction-finding equipment including a first rotatable, directional energy-receiving device and with range-finding equipment including a second, rotatable, directional energy-receiving device and an indicator for displaying both range and bearing information for remote objects, recording means, means alternately coupling said first device to said recording means, for recording the bearing at which energy is received thereby from an energy-transmitting object, and said second device to said recording means for recording the angular position of said second device, means responsive to said recorded bearing and said recorded position for deriving a control signal only when said second device is rotated to said bearing at which energy is received, and means coupling said last-mentioned means to said indicator to produce an indication in response to said control signal.

4. A bearing-correlating system for a pair of rotatable, directional, energy-receiving devices comprising pulse-generating means mechanically coupled to said devices for producing in accordance with rotation of each of said devices a reference pulse delineating a fixed angular position followed by a continuous series of pulses defining a succession of equal angular steps from said position, a pulse counter for deriving a control potential in response to the application of two series of pulses having a predetermined sum relationship with respect to one another, a means electrically coupling said pulse-generating means and said pulse counter and electrically coupled to one of said devices for alternately applying to said counter a number of pulses in the continuous series of pulses following the one of said reference pulses associated with said one device and preceding the interception energy from a remote station at a given bearing by said one device and for applying to said counter the continuous series of pulses following the other of said reference pulses to produce said control potential with the occurrence of said predetermined sum relationship, and means for utilizing said control potential to facilitate the orientation of the other of said devices relative to said given bearing.

5. A bearing-correlating system for a pair of directional, energy-receiving devices rotatable in the same relative direction about parallel axes comprising pulse-generating means mechanically coupled to said devices for producing in accordance with rotation of each of said devices a reference pulse delineating a fixed angular position followed by a continuous series of pulses defining a succession of equal angular steps from said position, a counter for deriving a control potential in response to the application of the number of pulses occurring during a complete revolution of one of said devices, a relay circuit electrically coupling said pulse-generating means and said counter for applying to said counter a quantity of pulses in the continuous series of pulses following the reference pulse for an associated one of said devices and preceding the interception of energy by said one device from a remote station at a given bearing thereby to record said quantity in said counter, means electrically coupled to said counter and responsive to said interception of energy by said one device for changing the recorded total in said counter from said quantity to a value substantially equal to said number minus said quantity, means included in said relay circuit for applying to said counter the continuous series of pulses following the reference pulse associated with the other of said devices to produce said control potential with the occurrence of a number of pulses substantially equal to said quantity, and means for utilizing said control potential to produce an indication.

6. A bearing-correlating system for first and second rotatable, directional, energy-receiving devices comprising first and second pulse generators coupled to said first and second devices, respectively, for producing in accordance with rotation of the associated one of said devices a reference pulse delineating a fixed angular position followed by a continuous series of pulses defining a succession of equal angular steps from said position, a pulse counter for deriving a control potential in response to the application of two series of pulses having a predetermined sum relationship with respect to one another, a first relay responsive to the occurrence of an initial reference pulse associated with said first device for completing an electrical circuit between said first pulse generator and said counter and responsive to the interception of energy from a remote station at a given bearing by said first device for interrupting said electrical circuit thereby to record in said counter the number of pulses following said initial reference pulse and preceding said interception, a second relay responsive to the said interception and to the succeeding one of the reference pulses from said second pulse generator for completing another electrical circuit between said second pulse generator and said counter and responsive to the occurrence of said control potential for interrupting said other electrical circuit, and means for utilizing said control potential.

7. A bearing-correlating system for first and second rotatable, directional, energy-receiving devices comprising first and second pulse generators coupled to said first and second devices, respectively, for producing in accordance with rotation of the associated one of said devices a reference pulse delineating a fixed angular position followed by a continuous series of pulses defining a succession of equal angular steps from said position, a pulse counter for deriving a control potential in response to the application of two series of pulses having a predetermined sum relationship with respect to one another, a first relay responsive to the occurrence of an initial reference pulse associated with said first device for completing an electrical circuit between the pulse generator and said counter and responsive to the interception of energy from a remote station at a given bearing by said first device for interrupting said electrical circuit thereby to record in said counter the number of pulses following said initial reference pulse and preceding said interception, a second relay responsive to said interception and to the succeeding one of the reference pulses from said second pulse generator for completing another electrical circuit between said second pulse generator and said counter and responsive to the occurrence of said control potential for interrupting said other electrical circuit, means interlocking the operation of said first and second relays so that each of said electrical circuits is completed only in the presence of an interruption in the other, and means for utilizing said control potential.

8. In combination a first pulse generator for producing a series of pulses defining incremental angular movements of a first rotatable device, a first counter coupled to said first pulse generator for deriving a sum of at least a portion of the pulses in said series, a second counter coupled to said first pulse generator for deriving another sum of at least a portion of the pulses in said series, a second pulse generator coupled to said first and second counters for producing another series of pulse defining incremental angular movements of a second rotatable device, and means included in said first and second counters for producing one indication only upon the application to said first counter of a number of pulses of said other series substantially equal to said first mentioned sum and for producing another indication only upon the application to said second counter of a number of pulses of said other series substantially equal to said other sum.

9. A bearing-correlating system for a pair of rotatable, directional, energy-receiving devices comprising pulse-generating means coupled to said devices for producing in accordance with rotation of each of said devices a reference pulse delineating a fixed angular position followed by a continuous series of pulses defining a succession of equal angular steps from said position, a plurality of pulse counters each adapted to derive a control potential in response to the application of two series of pulses having a predetermined sum relationship with respect to one another, one relay circuit electrically coupling said pulse-generating means and a first of said pulse counters and electrically coupled to one of said devices for applying to said first counter a number of pulses in the continuous series of pulses following the one of said reference pulses associated with said one device and preceding the interception of energy from a first remote station at a given bearing by said one device and for applying to said first counter the continuous series of pulses following the other of said reference pulses to produce a first control potential with the occurrence of said predetermined sum relationship, another relay circuit electrically coupling said pulse generating means and a second of said counters and electrically coupled to said one device for applying to said second counter another number of pulses in the continuous series of pulses following said one reference pulse and preceding the interception of energy from a second remote station at a different bearing by said one device and for applying to said second counter the continuous series of pulses following said other reference pulse to produce a second control potential with the occurrence of said predetermined relationship, and means for utilizing each of said control potentials to produce individual indications.

10. In combination, first means for producing a first signal defining incremental angular movements of a first rotatable device, second means responsive to said first signal for producing a second signal indicative of an accumulation of said angular movements, a third means for producing a further signal defining incremental angular movements of a second rotatable device, and means responsive to said second signal and said further signal only when said second and further signals have a predetermined signal characteristic relationship for producing an indication.

11. In combination, a first and second angularly moveable device, means for providing first signals defining incremental angular movements of said first device, means responsive to said first signal for providing a second signal indicative of an accumulation of said angular movements, a third means for producing a further signal defining angular position of said second device, and means responsive to said second signal and said further signal for producing an indication when said second signal substantially equals said further signal.

12. In combination, a first and second rotatable device, a first signal generator for producing first signal defining incremental angular movements of said first rotatable device, a first counter responsive to said first signal from said first signal generator for providing a second signal indicative of an accumulation of said angular movements, a second counter coupled to said first signal generator for providing a third signal indicative of another accumulation of said angular movements, a second signal generator coupled to said first and second counters for producing a further signal indicative of the angular position of said second rotatable device, said first counter responsive to said further and second signals being equal to provide a first indication, said second counter responsive to said further and third signals being equal to provide a second indication.

13. In combination, a first and second angularly moveable device, means for providing first signals defining incremental angular movements of said first device, means responsive to said first signal for providing a second signal indicative of an accumulation of said angular movements, a third means for producing a further signal defining incremental angular movements of said second rotatable device, and means responsive to said second and further signals having a predetermined signal characteristic relationship for producing an indication.

References Cited in the file of this patent

UNITED STATES PATENTS

| | | |
|---|---|---|
| 2,513,962 | Patterson | July 4, 1950 |
| 2,551,589 | Everhart | May 8, 1951 |
| 2,615,127 | Edwards | Oct. 21, 1952 |
| 2,668,870 | Ridler | Feb. 9, 1954 |